United States Patent
Goteti et al.

(10) Patent No.: US 12,428,231 B2
(45) Date of Patent: Sep. 30, 2025

(54) METHOD OF ENHANCING CARBON DIOXIDE STORAGE CAPACITY IN SALT CAVERNS

(71) Applicant: ARAMCO SERVICES COMPANY, Houston, TX (US)

(72) Inventors: Rajesh Goteti, Katy, TX (US); Hasmukh A. Patel, Houston, TX (US)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 79 days.

(21) Appl. No.: 18/185,733

(22) Filed: Mar. 17, 2023

(65) Prior Publication Data

US 2023/0296003 A1 Sep. 21, 2023

Related U.S. Application Data

(60) Provisional application No. 63/269,508, filed on Mar. 17, 2022.

(51) Int. Cl.
*B65G 5/00* (2006.01)
*E21B 33/03* (2006.01)
(Continued)

(52) U.S. Cl.
CPC ............... *B65G 5/00* (2013.01); *E21B 33/03* (2013.01); *E21B 41/0064* (2013.01); *E21B 43/28* (2013.01); *F17C 1/007* (2013.01); *F17C 11/007* (2013.01); *F17C 2221/033* (2013.01); *F17C 2223/035* (2013.01); *F17C 2223/036* (2013.01); *F17C 2270/0155* (2013.01)

(58) Field of Classification Search
CPC ...... E21B 41/0064; E21B 43/28; E21B 33/03; E21B 41/0057; B65G 5/00; F17C 11/007; F17C 2221/033; F17C 2223/035; F17C 2223/036; F17C 2270/0155
See application file for complete search history.

(56) References Cited

U.S. PATENT DOCUMENTS

| | | | |
|---|---|---|---|
| 3,574,402 | A | 4/1971 | Davis, II et al. |
| 3,724,898 | A | 4/1973 | Jacoby |

(Continued)

FOREIGN PATENT DOCUMENTS

| | | | |
|---|---|---|---|
| CA | 2844919 A1 | | 2/2012 |
| JP | 2010201330 | * | 9/2010 |
| JP | 2010201330 A | | 9/2010 |

OTHER PUBLICATIONS

Patel et al., High capacity carbon dioxide adsorption by inexpensive covalent organic Polymers, J. Mater. Chem., 2012, 22, 8431. <https://doi.org/10.1039/C2JM30761H>.

(Continued)

*Primary Examiner* — Carib A Oquendo
(74) *Attorney, Agent, or Firm* — Osha Bergman Watanabe & Burton LLP

(57) ABSTRACT

The present disclosure is directed toward a method for storing carbon dioxide. The method for storing carbon dioxide comprises several steps. A dissolving fluid comprising water is injected into a salt formation to produce a brine and a salt cavern within the salt formation. The brine is then removed from the salt cavern. A sorbent is then placed within the salt cavern before carbon dioxide is injected into the salt cavern.

11 Claims, 2 Drawing Sheets

(51) Int. Cl.
| | |
|---|---|
| *E21B 41/00* | (2006.01) |
| *E21B 43/28* | (2006.01) |
| *F17C 1/00* | (2006.01) |
| *F17C 11/00* | (2006.01) |

(56) References Cited

U.S. PATENT DOCUMENTS

| | | | | |
|---|---|---|---|---|
| 3,807,181 | A | | 4/1974 | Kuhne |
| 4,949,749 | A | * | 8/1990 | Fowler ............... B65G 5/00 |
| | | | | 405/59 |
| 5,957,539 | A | * | 9/1999 | Durup ............... E21B 43/28 |
| | | | | 299/4 |
| 9,718,618 | B2 | | 8/2017 | Oates |
| 10,816,494 | B2 | * | 10/2020 | Cerepi ............. G01N 27/026 |
| 11,560,322 | B1 | * | 1/2023 | Lu ..................... C02F 1/265 |
| 2009/0309408 | A1 | * | 12/2009 | Bishop .................. F16L 9/19 |
| | | | | 299/5 |
| 2011/0033238 | A1 | | 2/2011 | Riese |
| 2011/0175428 | A1 | | 7/2011 | Haugen |
| 2011/0305515 | A1 | * | 12/2011 | Drnevich ............. B65G 5/00 |
| | | | | 405/53 |
| 2014/0262739 | A1 | * | 9/2014 | Fong .................. F24S 10/13 |
| | | | | 202/234 |
| 2016/0089705 | A1 | * | 3/2016 | Oates .................. B09C 1/02 |
| | | | | 405/57 |
| 2016/0341023 | A1 | * | 11/2016 | Jacobson ............ E21B 43/28 |
| 2016/0361741 | A1 | * | 12/2016 | Kondo .................. C02F 1/52 |

OTHER PUBLICATIONS

Patel et al., Highly Stable Nanoporous Sulfur-Bridged Covalent Organic Polymers for Carbon Dioxide Removal, Adv. Funct. Mater. 2013, 23, 2270-2276. <https://doi.org/10.1002/adfm.201202442>.
Ullah et al., Investigation of Ester- and Amide-Linker-Based Porous Organic Polymers for Carbon Dioxide Capture and Separation at Wide Temperatures and Pressures, ACS Appl. Mater. Interfaces 2016, 8, 20772?20785. <https://doi.org/10.1021/acsami.6b05927>.
Deniz et al., A combined computational and experimental study of high pressure and supercritical CO2 adsorption on Basolite MOFs, Microporous and Mesoporous Materials 175 (2013) 34-42. <http://dx.doi.org/10.1016/j.micromeso.2013.03.015>.
Patel et al., Carbon Dioxide Capture Adsorbents: Chemistry and Methods, ChemSusChem, 2016, <https://doi.org/10.1002/cssc.201601545>.
Caglayan, D.G., Weber, N., Heinrichs, H.U., Linßen, J., Robinius, M., Kukla, P.A. and Stolten, D., 2020. Technical potential of salt caverns for hydrogen storage in Europe. International Journal of Hydrogen Energy, 45(11), pp. 6793-6805.
Habibi, R., 2019. An investigation into design concepts, design methods and stability criteria of salt caverns. Oil & Gas Science and Technology-Revue d'IFP Energies nouvelles, 74, p. 14.
Islamoglu et al., 2018. Benchmark Study of Hydrogen Storage in Metal? Organic Frameworks under Temperature and Pressure Swing Conditions, ACS Energy Lett., 3, 748-754.
Kapelewski et al., 2018. Record High Hydrogen Storage Capacity in the Metal? Organic Framework Ni2(m?dobdc) at Near-Ambient Temperatures, Chem. Mater., 30, 8179-8189.
Laban, M.P., 2020. Hydrogen Storage in Salt Caverns: Chemical modelling and analysis of large-scale hydrogen storage in underground salt caverns.
Marco-Lozar et al., 2002. Activated carbon monoliths for methane storage: influence of binder, Carbon, 40, 2817-2825.
Mohan et al., 2018. Hydrogen storage in carbon materials—A review, Energy storage, e35. 1-26.
Singh, V.K., 2010. Geological storage: underground gas storage.
Tarkowski, R. and Czapowski, G., 2018. Salt domes in Poland-potential sites for hydrogen storage in caverns. International Journal of Hydrogen Energy, 43(46), pp. 21414-21427.
Warren, J.K., 2006. Evaporites: sediments, resources and hydrocarbons. Springer Science & Business Media.
Warren, J.K., 2017. Salt usually seals, but sometimes leaks: Implications for mine and cavern stabilities in the short and long term. Earth-science reviews, 165, pp. 302-341.
Zivar, D., Kumar, S. and Foroozesh, J., 2020. Underground hydrogen storage: A comprehensive review. International Journal of Hydrogen Energy.
Prosniewski et al., Controlled charge and discharge of a 40-L monolithic adsorbed natural gas tank, Adsorption (2018) 24:541-550, <https://doi.org/10.1007/s10450-018-9961-2>.
Marco-Lozar et al., Gas storage scale-up at room temperature on high density carbon materials, C A R B O N 76 (2014) 123-132, <http://dx.doi.org/10.1016/j.carbon.2014.04.058>.
Rozyyev et al., High-capacity methane storage in flexible alkane-linked porous aromatic network polymers, Nature Energy, 4, 604, 2019. <https://doi.org/10.1038/s41560-019-0427-x>.
Mason et al., Methane storage in flexible metal-organic frameworks with intrinsic thermal management, Nature, 527, 357-361, 2015. <https://doi.org/10.1038/nature15732>.
Tedds, Steven Paul "Microporous Materials for Hydrogen Storage"; A thesis, Dec. 2010.
Blankenship, et al. "Oxygen-rich microporous carbons with exceptional hydrogen storage capacity"; Nature Communications, Oct. 29, 2021.
Andersson, et al. "Large-scale Storage of Hydrogen"; International Journal of Hydrogen Energy, May 3, 2019.
Ramirez-Vidal, et al. "A Step Forward in Understanding the Hydrogen Absorption and Compression on Activated Carbons"; ACS Applied Materials & Interfaces, Mar. 4, 2021.
Rozzi, et al. "Dynamid modeling and thermal management of a Power-to-Power system with hydrogen storage in microporous absorbent materials"; Journal of Energy Storage, Jul. 31, 2021.
Sdanghi, et al. "Towards Non-Mechanical Hybrid Hyrdogen Compression for Decentralized Hydrogen Facilities"; Energies, Jun. 17, 2020.
Non-Final Office Action issued by the U.S. Patent Office for corresponding U.S. Appl. No. 18/185,667, mailed Nov. 27, 2024 (7 pages).
Office Action issued by the Saudi Arabian Patent Office for corresponding Saudi Arabian patent application No. 123446812, mailed Mar. 23, 2025 (9 pages).

\* cited by examiner

METHOD OF ENHANCING CARBON DIOXIDE STORAGE CAPACITY IN SALT CAVERNS

BACKGROUND

The atmospheric concentration of greenhouse gas, such as carbon dioxide, is steadily increasing and is considered to be one of the significant parameters contributing toward climate change. Technologies for carbon dioxide capture and sequestration are an important tool in mitigating the emission of carbon dioxide and reducing the effect of carbon dioxide-producing industrial processes on the global climate. Carbon dioxide is expected to be stored away, once captured, as the industrial demand for carbon dioxide is far smaller than the quantity produced. Large-scale gas storage technologies must therefore be developed to provide methods of carbon dioxide sequestration.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a system and a method for storing carbon dioxide. The system for storing carbon dioxide comprises a salt formation, an overburden, an underburden, a salt cavern within the salt formation, a sorbent within the salt cavern, and a well traversing the surface that connects the surface with the salt cavern. The overburden is proximal to the surface and adjacent to the salt formation, whereas the underburden is also adjacent to the salt formation but is distal to the overburden.

The method for storing carbon dioxide comprises several steps. A dissolving fluid comprising water is injected into a salt formation to produce a brine and a salt cavern within the salt formation. The brine is then removed from the salt cavern. A sorbent is then placed within the salt cavern before carbon dioxide is injected into the salt cavern.

Other aspects and advantages of the claimed subject matter will be apparent from the following description and the appended claims.

DETAILED DESCRIPTION

Figure 1:
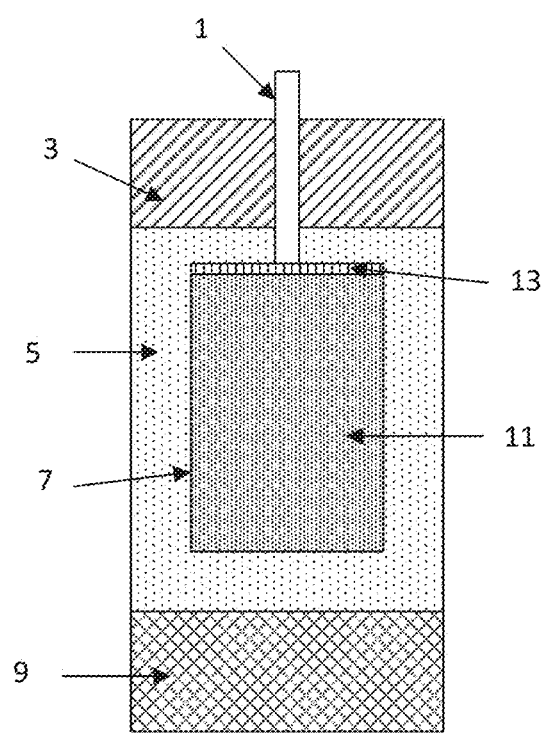
FIG. 1 is an illustration of a carbon dioxide storage system according to embodiments herein.

Carbon dioxide sequestration is useful with carbon capture, as more carbon dioxide is produced than is needed industrially. Storage underground in salt caverns can be used, but there is a limitation on the availability of salt caverns around the world. Therefore, the modification of salt caverns to enhance the carbon dioxide storage capacity could lead to the efficient use of these geological structures.

Carbon dioxide may be stored, according to embodiments herein, in high surface area materials within engineered salt caverns to increase the overall storage capacity in salt caverns. During or following formation of an engineered salt cavern, sorbent materials may be placed in the engineered salt caverns. Carbon dioxide, when disposed within the sorbent-filled engineered salt cavern, will adsorb onto the sorbent materials, allowing for efficient subterranean gas storage. This would enable effective sequestration to be carried out. In some embodiments, due to the solid nature of sorbent, formation pressure in a salt formation that is caused by weight of the overlying rock may be able to be resisted, at least in part, by the solid sorbent particles.

The maximum amount of carbon dioxide that may be stored in a salt cavern is bounded by the pressure from the rock above, the strength of the rock in the formation, and other properties. That is to say, the maximum total amount of carbon dioxide that may be stored in a salt cavern is defined by factors including the salt cavern's depth, the weight of the rock above the salt cavern, the strength and resistance to fracture of the surrounding rock, other factors known to those skilled in the art, and, in embodiments herein, the added support provided to the cavern by the solid sorbents disposed within the cavern for use in storing the gas.

There are several types of sorbents that may be used. "Sorbent" here is defined as a material that supports physical storage of a gas that concentrates on the surface of the material. Typically, these materials have large surface areas. In some embodiments, this allows carbon dioxide to adsorb onto the surface, enabling a carbon dioxide to be stored under pressure in a smaller space than would otherwise be possible. The higher adsorption of gas of these materials originates from the adsorption of gases in the microporous networks of these materials. Sorbents that are porous with microscopic pores of less than 2 nm in diameter are known here as "microporous materials". Sorbents that are porous with microscopic pores of between 2 nm and 50 nm are known here as "mesoporous materials". Sorbents that are porous and comprise microscopic pores up to 100 nm are known as "nanoporous".

Surface areas per gram of sorbents may vary from 100-7000 $m^2/g$ in some embodiments, from 500-5000 $m^2/g$ in other embodiments, and from 1000-3000 $m^2/g$ in other embodiments. Pore volume per gram of the sorbents may vary from about 0.1-2.5 $cm^3/g$ in some embodiments. The pore volume per gram may be in a range with a maximum of any of about 2.5 $cm^3/g$, 2.0 $cm^3/g$, 1.5 $cm^3/g$, 1.0 $cm^3/g$, or 0.50 $cm^3/g$, and a minimum of any of about 0.1 $cm^3/g$, 0.2 $cm^3/g$, or 0.35 $cm^3/g$, with any maximum being capable of being combined with any minimum. Micropore volume per gram of the sorbent may vary from about 0.05-1.5 $cm^3/g$. Micropore volume per gram of the sorbent may be in a range with a maximum of any of about 1.5 $cm^3/g$, 0.75 $cm^3/g$, or 0.50 $cm^3/g$ and a minimum of any of about 0.05 $cm^3/g$, 0.1 $cm^3/g$, or 0.3 $cm^3/g$, with any maximum being capable of being combined with any minimum. Sorbents may have a density that ranges from 0.1-4.0 $g/cm^3$ in some embodiments. Sorbents may have a density that is in a range with a maximum of any of about 4.0 $g/cm^3$, 3.8 $g/cm^3$ or 3.5 $g/cm^3$ and a minimum of any of about 0.1 $g/cm^3$, 0.4 $g/cm^3$, 0.5 $g/cm^3$, 1.0 $g/cm^3$, or 1.25 $g/cm^3$, with any maximum being capable of being combined with any minimum.

In one or more embodiments, sorbents may have one or more shapes that include, but are not limited to, spherical, cubic, oval, cylindrical pellets, capsules, fibers, or mixture of these. In one or more embodiments, the sorbents may comprise materials that are organic, inorganic, organic-inorganic hybrids, or a mixture of these materials. The sorbents may also comprise materials that are amorphous, crystalline, polycrystalline or a mixture of these materials. In one or more embodiments, activated carbons that may be generated from polymers or natural polymers may be used as sorbents. Sorbents may also comprise metal-organic frameworks, amine-impregnated metal-organic frameworks. In other embodiments, sorbents may comprise aluminosilicates or zeolite-type materials. In one or more embodiments, sorbents may comprise porous silicates and porous silica, including mesoporous silicas. In one or more embodiments, sorbents may comprise porous polymers, including nanoporous polymers. Sorbents may also comprise a combination of two or more of these porous materials or other sorbents as may be developed or known to those of skill in the art. In one or more embodiments, sorbents may comprise microporous or mesoporous materials, which allow enhanced storage.

Sorbent particles may have a particle size that ranges from 5 to 1000 microns in some embodiments, from 10 to 500 microns in other embodiments, and from 50 to 100 microns in other embodiments.

Sorbent may be conglomerated into larger particles through the use of binders. These binders may be mixed with the sorbent to form larger conglomerations that may take the form of binder/sorbent particles, or particles comprised of binder and sorbent. Average size of the binder/sorbent particles may range from 1-20 mm in some embodiments. In other embodiments, the size of the binder/sorbent particles may have a range with an upper limit of any of 20 mm, 10 mm, or 5 mm, and a lower limit of any of 1 mm, 2 mm, or 3 mm, with any upper limit being capable of being combined with any lower limit. The binder is characterized by its ability to form the sorbent into particles, and may comprise one or more of bentonite, polymer, natural polymer, or other material capable of forming conglomerations. These conglomerations may also include other materials known to those skilled in the art for their ability to form conglomerations, to stabilize conglomerations, or for other purposes.

Carbon dioxide molecules may diffuse easily through some geological formations. Salt formations are rock layers, the plurality of which is comprised of a dissolvable salt material, such as sodium chloride or other halite-forming salts. Closer to the surface, above the salt formation, lies an overburden, which is the rock and/or soil that is adjacent to and rests on top of the salt formation. Below the salt formation is the underburden, which is the rock and soil that is adjacent to and lies directly below the salt formation. The underburden is distal to the overburden. The temperature of salt formations useful in embodiments herein may range from 5-50° C., for example, from 10-35° C. in other embodiments, and from 20-25° C. in other embodiments.

Salt caverns are man-made structures in salt formations. These salt formations have low permeability to the stored gas, such as, for example, $10^{-6}$ to $10^{-9}$ millidarcy (mD), allowing for gas under pressure to remain in a cavern for long periods. Low permeability of salt formations facilitates the storage of gas within a salt cavern produced within them. In one or more embodiments, the permeability of the formation may be less than about $10^{-15}$ m$^2$. In one or more embodiments, the permeability of the formation may have a range with an upper limit of any one of $10^{-15}$ m$^2$, $10^{-18}$ m$^2$, or $10^{-21}$ m$^2$. In one or more embodiments, the permeability of the formation may range from about $10^{-15}$ m$^2$ to less than $10^{-21}$ m$^2$. This allows for storage of gas, as salt caverns are typically made to have volumes ranging from about 100,000 m$^3$ to about 5,000,000 m$^3$. The volume range may have an upper limit of any of 5,000,000 m$^3$, 3,000,000 m$^3$, or 1,000,000 m$^3$, and a lower limit of any of 10,000 m$^3$, 200,000 m$^3$, or 500,000 m$^3$, with any upper limit being combinable with any lower limit. Larger or smaller volumes are possible in some embodiments.

In some embodiments, the salt cavern may be formed having a shape such as cylindrical, ellipsoid, or capsule-shaped. In other embodiments, such as salt caverns in bedded salt formations, the cavern may have an irregular geometry. The salt cavern may have a diameter, or effective diameter, ranging from 5 m to 100 m in some embodiments, from 10 m to 50 m in other embodiments, or from 25 m to 40 m in other embodiments. The length of the salt cavern may range from 100 m to 2000 m in some embodiments, from 200 m to 1000 m in other embodiments, or from 300 m to 500 m in other embodiments. The sizes of salt caverns that can be produced may depend on the initial size of the salt formation, the amount of carbon dioxide that is desired to be stored, along with the stability of the salt cavern, or its ability to remain structurally intact over long periods. This size, the strength of the walls of the cavern, and its depth from the surface are some parameters that need to be considered in the design of salt caverns and multiple salt cavern systems.

In some embodiments, a salt cavern may be created by drilling a well into a salt formation and injecting a dissolving fluid into the salt formation that facilitates dissolution of the salt. This dissolving fluid is typically water, in the form of fresh water, sea water, or brine-based aqueous fluids, but may comprise other compounds or materials. A cavern that is formed by this process is filled with brine (dissolving fluid comprising dissolved salts). The solvation of salt may be carried out at various leaching rates 0.1-30 m$^3$/h, which may depend on the temperature. The brine is subsequently removed, leaving behind a salt cavern of a particular size or dimension. Insoluble material in the salt formation may fall to or accumulate at the bottom of the cavern.

Injection of the dissolving fluid and removal of the brine may be performed using a single pipe or multiple pipes. For example, multiple pipes may be disposed through the same well in some embodiments, with a smaller diameter pipe inside of a larger diameter pipe, leaving an open annulus in the larger diameter pipe and an open channel in the smaller diameter pipe. In one or more embodiments, the smaller diameter pipe may be longer, with dissolving fluid being injected into the formation either via the shorter or longer pipe. The dissolving fluid may be injected via the larger pipe, through the annulus, and withdrawn through the inner pipe, in some embodiments. In other embodiments, the dissolving fluid may be injected via the inner pipe and withdrawn through the annulus. The annular pipe may terminate, for example, proximate a roof of the cavern, while the inner pipe may be extended during cavern formation to be proximate a bottom of the cavern throughout the cavern-forming process. The circulation pattern and injection method, among other variables, may influence cavern shape and size.

Dissolving fluid may be injected into the formation multiple times to produce a salt cavern of desired dimensions. Compressed gas, such as air, may be used to remove the dissolving fluid, to remove contaminants, and to prevent collapse of the salt cavern during formation (the compressed gas providing a cushion gas during cavern formation). The brine and insoluble particles may be removed with compressed air at a pressure that may range from 15-3000 psi (100-21000 kPa). Typical depths of the roof of the salt cavern from the surface may range from 100 m to 5000 m in some embodiments, from 500 m to 2500 m in other embodiments, and from 1000 m to 1500 m in other embodiments. In some embodiments, salt caverns of other dimensions or those produced through other methods may be possible as well. In one or more embodiments, a field of multiple salt caverns in a salt formation may be employed. In one or more embodiments, more than one well may be drilled for a single salt cavern, particularly in the case of salt formations that are more than 500 m thick or in other situations apparent to those skilled in the art. The number of wells may be governed, for example, by the size and shape of the salt layers.

After a salt cavern is produced, sorbents suitable for adsorbing the gas to be stored are then placed in the cavern. In some embodiments, the sorbent may be placed by a carrying fluid, characterized by its ability to carry the sorbent into the salt cavern. The carrying fluid may be a liquid, a gas, or other material suitable for carrying the sorbent. In some embodiments, the carrying fluid is a liquid, and the sorbent is carried into the salt cavern as a dispersion or slurry in the liquid. The concentration of sorbents in the carrying fluid may vary from 1-75 wt %. In one or more embodiments, placing the sorbents in the salt cavern is done in several steps, where the sorbent in the carrying fluid is pumped into the salt cavern, the sorbents are allowed to settle gravitationally, and the excess carrying fluid is then removed from the salt cavern through compressed air pressurization. The time required to settle the sorbent varies with respect to sorbent density and may range from 1 hour to 24 hours. The compressed gas may also be used as a cushion gas during sorbent injection to prevent wall collapse. Injection of sorbent with concurrent removal of liquids or other carrier fluids is also envisioned.

In one or more embodiments, vacuum or pressure is employed to facilitate removal of the carrying fluid once the salt cavern has been filled with sorbents, leaving behind a salt cavern filled with dry sorbent. In one or more embodiments, the sorbent quantity may be in a range with an upper limit of any of about 2 million metric tons, 1 million metric tons, or 0.5 million metric tons, and a lower limit of any of 50 metric tons, 500 metric tons, or 1000 metric tons, with any upper limit being combinable with any lower limit. In some embodiments, for example, following cavern formation, the outer pipe may be proximate a cavern roof, and the inner pipe may be proximate a floor of the cavern. A slurry of sorbents may be injected via the annulus, and the liquids may be withdrawn through the inner pipe. To prevent undesired entrainment of sorbent with the removed liquids, a filter or other device restricting influx of sorbent to the inner pipe may be used in some embodiments. In other embodiments, filtration may not be used. In one or more embodiments, the sorbent may be in the form of pellets or monoliths held together using binders, rather than in a fine powdered form and filtration may not be part of the operation. In these cases, the density and size of the sorbents/binder particles is great enough that the particles may settle in the cavern based on their densities, allowing separation of particles from carrying fluid via sedimentation.

As noted above, sorbent may be disposed into the cavern and allowed to settle via gravity. Natural settling of the sorbents, however, may result in an inefficient filling of the cavern with sorbent, especially for sorbents that do not easily flow. Free-flowing sorbents may fill the cavern more readily, but even free-flowing sorbents may have difficulty in completely filling the top of the cavern. Agitation or dispersion devices may be used to ensure that the cavern is properly filled and/or to promote settling of the sorbents. In one or more embodiments, downhole tools may be used through the drill pipe to place the sorbent and fluid into the cavern. For example, among other tools that may be used, various tools that may provide for control of the direction of flow into the cavern may be used to facilitate distribution. The salt cavern may be filled step-by-step to improve filling characteristics.

As one skilled in the art could readily envisage, filling a cavern with a sorbent may result in an uneven distribution of the sorbent within the cavern. Efficient distribution and settling (packing) of the sorbent within the volume of the cavern may provide for the maximum support being provided by the sorbent to the walls of the cavern, thus maximizing the working volume (minimizing the needed cushion gas volume or pressure) and minimizing the possibility for collapse or other damage to the cavern.

In some embodiments, placement of the sorbent according to embodiments herein may result in the sorbent occupying at least 90 vol % of the cavern (total volume of solids, including void space between particles), at least 95 vol % of the cavern in other embodiments, and at least 98 vol % or at least 99 vol % of the cavern in other embodiments. In yet other embodiments, 100 vol % of the cavern may be occupied by sorbent, and in yet other embodiments, the cavern may be over-filled with sorbent such that a portion of the well, below any valving or other sealing device attached to the well, also includes a volume of sorbent. The over-filling of the cavern may ensure each of the walls (floor, sides, and ceiling) are supported by sorbent, as well as providing some volume of sorbent to account for any additional settling of the sorbent that may occur due to pressurization and depressurization during normal use of the cavern. In one or more embodiments, it is preferred to fill the salt cavern as much as possible because the sorbent provides cavern stability in addition to enhanced storage capacity. Minimizing the head space unfilled with sorbent will provide maximum wall support and a maximum working volume. Accordingly, embodiments herein may provide for contact of a portion of the sorbent with each wall of the cavern (bottom, sides, and top), thereby providing support to each wall of the cavern.

Carbon dioxide is then inserted into the sorbent-filled salt cavern. The maximum amount of compressed carbon dioxide that may be inserted into the sorbent-filled salt cavern is determined by the carbon dioxide storage capacity of the sorbent, based on the pressure and temperature conditions of the salt cavern. Once the desired amount of gas is inserted in the sorbent-filled salt cavern, the well head of the sorbent-filled salt cavern is sealed. Releasing pressure at the surface can allow for the desorption of gas from the sorbent and the removal of gas from the sorbent-filled salt cavern, if necessary. Carbon dioxide may then be stored. The carbon dioxide storage capacity may be increased up to 2-fold in a cavern filled with sorbent when compared with an empty cavern. The pressure of the carbon dioxide after sealing may be in a range from about 500 psig to about 3000 psig.

FIG. 1 is an illustration of a carbon dioxide storage system according to embodiments herein. In FIG. 1, a well 1 traverses an overburden 3 and enters a salt formation 5, forming a pathway to a salt cavern 7. Underneath the salt formation 5 is an underburden 9. Inside of the salt cavern 7 is a carbon dioxide-adsorbed sorbent 11, and carbon dioxide gas 13 is stored in the cavern, both absorbed onto the sorbent and in the free space within the cavern. The well head is sealed, such as by a valve or other appropriate device, to prevent escape of the carbon dioxide when not being extracted.

Figure 2:
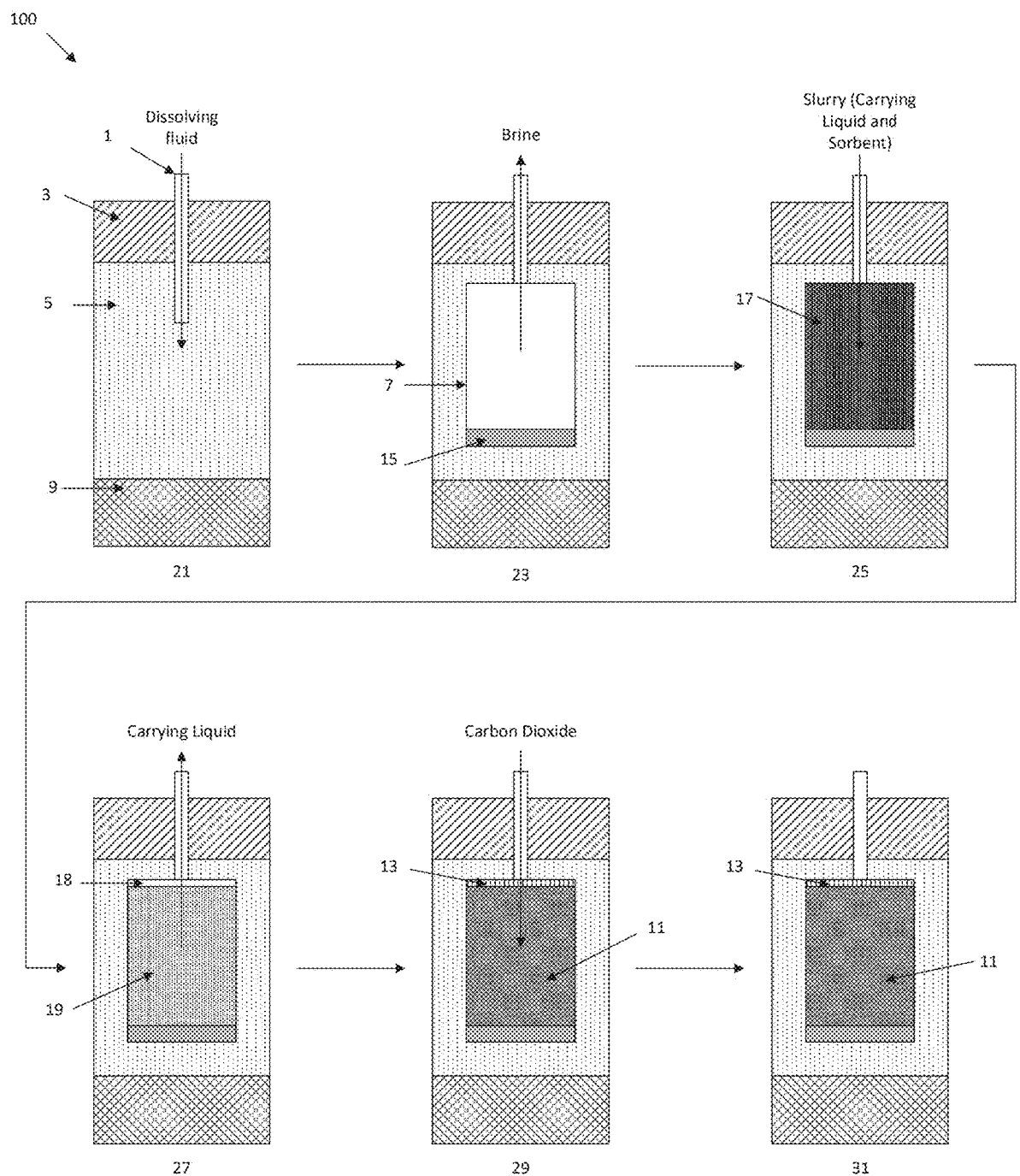
FIG. 2 illustrates a method 100 for effecting carbon dioxide storage according to embodiments herein.

FIG. 2 illustrates a method 100 for effecting carbon dioxide storage according to embodiments herein. Method 100 is representative of some embodiments of a method for producing a sorbent-filled salt cavern and storing carbon dioxide. In method 100, a well 1 is drilled through an overburden 3 into a salt formation 5, traversing the overburden 3 and entering the salt formation 5. The salt formation lies atop an underburden 9. A dissolving fluid, such as water or other solvents with sufficient salt dissolution capability and carrying capacity, is injected (step 21) into the salt formation 5 through the well 1. The dissolving fluid dissolves part of the salt formation 5. A salt cavern is created by the process of solution mining, where a feed solvent is injected (step 21) into a wellbore drilled into a subsurface salt formation. The brine thus generated by dissolving (leaching) the formation salt is then extracted (step 23) to create the cavity in the subsurface. The process of dissolution and brine extraction are repeated over multiple cycles until a cavern of desired dimensions in created in the subsurface.

The generally preferred shape for salt caverns is a generally cylindrical cavity several hundred meters high and 50-80 meters (m) in diameter. Depending upon the formation being dissolved and the desired shape of the cavern, direct (inject solvent at bottom of cavern, withdraw brine from top) or reverse (inject solvent at top, withdraw brine from bottom of cavern) brine circulation may be used to create the cavern. While the circulating solvent/brine may provide some weight (pressure) to support the cavern walls, a cushion gas, such as compressed air or compressed nitrogen, may be provided during the cavern formation process to ensure that the cavern is fully supported as it is being created.

The brine is then removed (step 23), leaving behind insolubles 15 and a salt cavern 7. The dehydration of the salt cavern can be carried out to remove water or brine from the caverns. The compressed air can be used for removing contaminates from the salt caverns and the cavern may be pressured with compressed air during the dehydration step to restrict the salt caverns from collapsing due to formation pressure.

Following formation of the salt cavern 7, sorbent-carrier fluid mixture 17 may be disposed within the cavern (step 25). In some embodiments, a slurry, comprising a carrying liquid and a sorbent, is injected (step 25) into the salt cavern 7. The slurry of sorbent 17 (dispersed in liquid-aqueous or nonaqueous) is pumped (step 25) into the salt cavern 7 in several steps. During each step, the sorbent 17 will be allowed to settle down gravitationally and the excess liquid is evacuated using compressed air. In other embodiments, the solid sorbents may be flowed (step 25) into the salt cavern 7 without the aid of a liquid, or transport of the solid sorbents may be facilitated using a carrier gas, such as air or nitrogen.

Once the salt cavern 7 is filled with the sorbent-carrier fluid mixture 17, the liquid can be removed through vacuum or pressure (step 27). In these embodiments, compressed gas 18 is injected, causing the carrying liquid to be removed (step 27), leaving behind a salt cavern filled with sorbent 19 and compressed gas 18. The pressure of the compressed gas may, for example, push the liquids out of a pipe extending to a floor of the cavern; a "dry" gas may also be used to remove liquids, such as water or other carrier fluids, from the sorbent. A dry gas is a low humidity gas that is capable of the uptake of water or moisture.

Carbon dioxide gas 13 is then pumped (step 29) into the salt cavern 7 filled with sorbent 17. Carbon dioxide gas 13 is compressed in the sorbent-filled salt cavern according to the theoretical capacity of the sorbents 17 based on the pressure and temperature condition of the salt cavern. Carbon dioxide gas 13 adsorbs onto the sorbents 17, producing carbon dioxide-adsorbed sorbent 11. On reaching the maximum carbon dioxide storage capacity, the well head of the salt caverns is closed (step 31) for long-term carbon dioxide storage. In one or more embodiments, closing the well head of the salt caverns (step 31) may be done via closing a valve on the surface. The carbon dioxide gas 13 from the carbon dioxide-adsorbed sorbent 11 can be released according to requirement from the surface through pressure release valves.

Other embodiments of the present invention aside from method 100 may be possible, using differing configurations, materials, and method steps readily envisioned by those skilled in the art based on the present description.

EXAMPLE 1

In Example 1, theoretical storage capacities of carbon dioxide gas in a storage tank with and without sorbent at several different pressures are shown at 35° C., 50° C., and 65° C. Carbon dioxide storage capacity without sorbent (open volume) is calculated using the ideal gas law. To derive the $CO_2$ storage capacity, the $CO_2$ storage capacity measured at different temperatures and pressures was calculated using various adsorbent materials. The sorbents utilized are: Adsorbent 1: COP-1, from Patel et al., High capacity carbon dioxide adsorption by inexpensive covalent organic Polymers, J. Mater. Chem., 2012, 22, 8431; Adsorbent 2: COP-3, from Patel et al., Highly Stable Nanoporous Sulfur-Bridged Covalent Organic Polymers for Carbon Dioxide Removal, Adv. Funct. Mater. 2013, 23, 2270-2276; Adsorbent 3: COP-35, from Ullah et al., Investigation of Ester- and Amide-Linker-Based Porous Organic Polymers for Carbon Dioxide Capture and Separation at Wide Temperatures and Pressures, ACS Appl. Mater. Interfaces 2016, 8, 20772-20785; and Adsorbent 4: C300, from Deniz et al., A combined computational and experimental study of high pressure and supercritical CO2 adsorption on Basolite MOFs, Microporous and Mesoporous Materials 175 (2013) 34-42.

Storage capacity with sorbent is calculated based on the amount of carbon dioxide adsorbed on the basis of the mass of adsorbent. Theoretical storage capacities are shown below in Table 1.

TABLE 1

Table 1: $CO_2$ storage capacity of empty storage tank and adsorbent-filled storage tank.

$CO_2$ storage capacity (Kg/m$^3$)

| Temperature (° C.) | Compressed $CO_2$ | Adsorbent 1 | Adsorbent 2 | Adsorbent 3 | Adsorbent 4 |
|---|---|---|---|---|---|
| 725 psig (5.00 MPa) | | | | | |
| 35 | 118.5 | 213.3 | 147.5 | 113.8 | 231.5 |
| 50 | 104.8 | 201.5 | 137.5 | 98.8 | 223.5 |
| 65 | 95.8 | 184.9 | 125.0 | 87.5 | 214.6 |
| 1450 psig (10.0 MPa) | | | | | |
| 35 | 700.1 | 734.7 | 477.5 | 550.0 | 248.0 |
| 50 | 384.4 | 545.1 | 357.5 | 275.0 | 238.6 |
| 65 | 272.9 | 450.3 | 302.5 | 241.3 | 229.8 |
| 2175 psig (15.0 MPa) | | | | | |
| 35 | 813.7 | 1185.0 | 750.0 | 743.8 | 249.4 |
| 50 | 699.8 | 1042.8 | 675.0 | 605.0 | 242.3 |
| 65 | 559.6 | 900.6 | 575.0 | 456.3 | 235.8 |
| 2900 psig (20.0 MPa) | | | | | |

TABLE 1-continued

Table 1: $CO_2$ storage capacity of empty storage tank and adsorbent-filled storage tank.

| Temperature (° C.) | Compressed $CO_2$ | Adsorbent 1 | Adsorbent 2 | Adsorbent 3 | Adsorbent 4 |
|---|---|---|---|---|---|
| | | $CO_2$ storage capacity (Kg/m³) | | | |
| 35 | 865.3 | 1327.2 | 825.0 | 828.8 | 251.4 |
| 50 | 784.4 | 1232.4 | 775.0 | 703.8 | 242.7 |
| 65 | 691.4 | 1113.9 | 700.0 | 605.0 | 234.9 |

TABLE 2

Table 2: $CO_2$ storage capacity (Kiloton) in salt cavern (volume: 1005459 m³)

| Temp. (° C.) | Compressed $CO_2$ | Adsorbent 1 | Adsorbent 2 | Adsorbent 3 | Adsorbent 4 |
|---|---|---|---|---|---|
| 725 psi (5.00 MPa) | | | | | |
| 35 | 119.1 | 214.5 | 148.3 | 114.4 | 232.8 |
| 50 | 105.4 | 202.5 | 138.3 | 99.3 | 224.7 |
| 65 | 96.3 | 185.9 | 125.7 | 88.0 | 215.7 |
| 1450 psi (10.0 MPa) | | | | | |
| 35 | 703.9 | 738.7 | 480.1 | 553.0 | 249.4 |
| 50 | 386.5 | 548.1 | 359.5 | 276.5 | 239.9 |
| 65 | 274.4 | 452.8 | 304.2 | 242.6 | 231.1 |
| 2900 psi (20.0 MPa) | | | | | |
| 35 | 870.0 | 1334.4 | 829.5 | 833.3 | 252.7 |
| 50 | 788.7 | 1239.1 | 779.2 | 707.6 | 244.1 |
| 65 | 695.1 | 1120.0 | 703.8 | 608.2 | 236.2 |

As described above, embodiments herein provide for forming a salt cavern, disposing a sorbent within the salt cavern, and storing gas in the sorbent-filled salt cavern. Use of a sorbent within the cavern advantageously provides a larger working gas volume (minimum amount of gas pressure required to prevent wall collapse) than for a cavern alone. Embodiments herein thus provide a method and system for the efficient storage of large volumes of gas for sequestration.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed:

1. A method for storing carbon dioxide comprising:
   injecting a dissolving fluid comprising water into a salt formation,
   producing a salt cavern within the salt formation and a brine;
   removing the brine from the salt cavern;
   placing a microporous sorbent within the salt cavern; and
   inserting carbon dioxide into the salt cavern.

2. The method of claim 1, wherein placing the sorbent within the salt cavern comprises injecting into the salt cavern a slurry comprising a carrying liquid and the sorbent.

3. The method of claim 2, wherein the placing further comprises allowing the sorbent to settle within the salt cavern, removing at least a portion of the carrying liquid from the salt cavern, and injecting an additional volume of the slurry into the salt cavern.

4. The method of claim 3, wherein the injecting, allowing to settle, and the removing are repeated until at least 95 vol % of the salt cavern is filled with the sorbent.

5. The method of claim 1, wherein placing the sorbent within the salt cavern comprises transporting the sorbent into the salt cavern using a compressed gas.

6. The method of claim 5, wherein the compressed gas is air.

7. The method of claim 1, wherein placing the sorbent within the salt cavern comprises at least one of distributing the sorbent within the salt cavern and agitating the sorbent within the salt cavern to facilitate settling of the sorbent.

8. The method of claim 1, wherein the sorbent comprises at least one microporous material selected from the group consisting of: activated carbons, metal organic frameworks, porous polymers, aluminosilicates, zeolites, porous silicates, and porous silica.

9. The method of claim 8, wherein the sorbent comprises the at least one microporous material and a binder.

10. The method of claim 1, further comprising sealing a well head of the salt cavern after the inserting.

11. The method of claim 10, wherein a pressure of the carbon dioxide after the sealing is in a range from 500 psig to 3000 psig.

* * * * *